Patented Mar. 22, 1938

2,111,973

UNITED STATES PATENT OFFICE 2,111,973

HYDROXYLATION OF ORGANIC COMPOUNDS

Vaman R. Kokatnur, New York, N. Y., assignor to Autoxygen Inc., New York, N. Y., a corporation of New York No Drawing. Application January 11, 1936, Serial No. 58,781

19 Claims. (Cl. 260—154)

The present invention relates to the hydroxylation of organic compounds and it particularly relates to a process of producing hydroxy-aromatic or phenolic compounds.

Although the invention may be generally applied to the production of organic hydroxy compounds broadly, it will be illustratively described in connection with the production of hydroxy benzene and hydroxy naphthalene combinations.

In the usual methods of producing aromatic hydroxy compounds, the intermediate halogenated or sulphonated hydrocarbon is first produced, isolated and purified, and then this compound is reacted with an alkali to replace the halogenated or sulpho groups with hydroxy groups.

However, the intermediate production and purification of the chlorinated or sulphonated hydrocarbon involves considerable labor and expense, and moreover in the case of the chlorinated hydrocarbon, the by-products, such as sodium chloride are not readily separated and are not of particular value when separated after extensive purification operations.

The object of the present invention is to provide a process of producing aromatic hydroxy compounds, which will produce phenols and naphthols at relatively low cost, with a minimum of operations and plant equipment, and which will eliminate the necessity of intermediate purification of the initial derivatives whether they be sulpho or halogen compounds of the hydrocarbons which are to be converted into their corresponding hydroxy aromatic derivatives.

Other objects will be obvious or will become apparent during the course of the following specification.

It has been found that the above objects may be attained by first halogenating or preferably sulphonating the desired hydrocarbon to be hydroxylated in the presence of an inert diluent and then following the halogenation or sulphonation by neutralization and alkalization which will cause replacement of the halogen or sulpho groups with hydroxy groups.

For example, in connection with aromatic hydrocarbons, such as benzene or naphthalene, these hydrocarbons may be suspended or dissolved in an inert hydrocarbon of alicyclic, aliphatic, aromatic or other nature which is relatively resistant to sulphonation while such aromatic hydrocarbon is being reacted with concentrated sulphuric acid, or the diluent or solvent may be a partly or wholly chlorinated or halogenated hydrocarbon in the case of halogenation reaction, which hydrocarbon should not be readily further chlorinated or halogenated.

It is even possible to utilize a liquid aromatic hydrocarbon itself as the diluent, so that in the case of benzene, or toluene, the liquid hydrocarbon will only be partly halogenated or sulphonated with sufficient excess hydrocarbon being present to serve as a diluent.

It is generally desirable to utilize a low boiling hydrocarbon for the first operation, such as gasoline, benzine or benzene and then the second operation, involving the substitution of the hydroxyl groups, is preferably carried out in the presence of a higher boiling hydrocarbon, such for instance as kerosene or aliphatic hydrocarbon fractions, boiling between 250° C. to 400° C.

To give another example, 100 parts of benzene are dissolved in 100 parts of a saturated aliphatic hydrocarbon oil, such as gasoline, or excess benzene itself may be utilized as the hydrocarbon diluent for the purpose. To this mixture is then added 100 parts of 66° Bé. or 99% sulphuric acid, and the mixture is gradually heated in a distilling apparatus until the distillation begins.

Distillation is then continued until the water formed during the sulphonation has been substantially all carried over along with the distillate, and the separation of the calculated amount of water in the distillate as a separate layer may be utilized as an indication of when the process is complete and when the water has all been removed.

When the reaction is thus completed the mixture containing the benzene sulphonic acid is permitted to cool in the still, and when cooled a high boiling fraction of kerosene, say boiling between 320° C. to 360° C. is added. Then with agitation a calculated amount of sodium carbonate is gradually added to neutralize the sulphonic acid and free sulphuric acid.

This neutralization will result in the ebullition of carbon dioxide keeping the mass agitated and in the generation of sufficient heat to substantially warm up the mixture.

To the neutralized mixture without cooling is then added caustic soda in about 5% to 10%, or even up to 50% excess.

Then heat is applied to cause distillation, and distillation is continued until all the water generated in the reaction has been removed and obtained in the distillate, as may be readily determined.

In the resultant mixture there is contained sodium phenolate and sodium sulphite or bisulphite according to the amount of caustic soda utilized, which materials will be in granular form.

The hydrocarbon residue or any residual traces of higher boiling point kerosene may be removed by filtration or by washing with a volatile solvent material, such as gasoline or carbon tetrachloride.

From the resultant mass the phenol and sulphites may be recovered. The phenol thus produced is of high purity and the sulphites which are obtained as a by-product are particularly valuable and may be readily sold.

The processes applicable to the production of other phenolic compounds and disulphonic acids may be made by utilizing other hydrocarbon solvents or diluents which will distil off at such temperature as so assure entry of a plurality of sulpho groups into the aromatic nucleus. The resultant neutralization and alkalization will then result in the formation of resorcinol.

With naphthalene, the naphthalene may be dissolved in the hydrocarbon solvent, the character of the solvent being so controlled that it will distil over at a temperature which will be approximately that giving optimum reaction conditions.

With chlorination or halogenation reactions, to produce the phenolic intermediates, the solvent may be tetra or tri chlor methane, tetra or higher chlor ethane, tri, tetra or penta chlor benzene, toluene or xylene and other fully chlorinated or halogenated hydrocarbons.

In connection with these reactions it is desirable to utilize substantially equivalent amounts of sulphonating acid and/or caustic soda and preferably in no case more than a 50% excess over that required by theory.

This will prevent side reactions and produce pure products whether they be sulphonic acids or phenolic compounds, the water being removed by the distillation operation with the hydrocarbon vapor to assure completion of the reaction.

The phenols, resorcinol, naphthols or other phenolic compounds produced according to the process of the present invention are particularly suitable for utilization in the plastic industries, as for example in making phenol formaldehyde resins and/or also particularly suitable as intermediates in making dye-stuffs.

It is to be understood that the processes described herein are subject to wide variations and many other applications, in which the inert diluents are utilized to control the temperature of the reaction and to enable ready elimination of water from the reaction sought, thus assuring completion of the reactions without the need of utilizing excess reagents.

It will thus be seen that there is herein described a process in which the several features of this invention are embodied, and which process in its action attains the various objects of the invention and is well suited to meet the requirements of practical use.

As many changes could be made in the above process and many apparently widely different embodiments of this invention could be made without departing from the scope thereof, it is intended that all matter contained in the above description shall be interpreted as illustrative and not in a limiting sense.

Having thus described my invention, what I claim as new and desire to secure by Letters Patent is:—

1. The process of hydroxylating aromatic organic compounds which comprises treating the corresponding aromatic hydrocarbon in the presence of a liquid, non-aqueous, relatively inert diluent to substitute a hydrogen atom attached to the aryl ring with an inorganic acid radical that is replaceable by the hydroxyl group and then neutralizing and treating with caustic alkali to replace said acid radical with a hydroxy-group without removing the diluent and finally isolating the hydroxy compound.

2. The process of hydroxylating aromatic organic compounds which comprises treating the corresponding aromatic hydrocarbon in the presence of a liquid, non-aqueous, relatively inert diluent to substitute a hydrogen atom attached to the aryl ring with an inorganic acid radical that is replaceable by the hydroxyl group and then neutralizing and treating with caustic alkali to replace said acid radical with a hydroxy-group without removing the diluent and finally isolating the hydroxy compound, the water formed during each reaction being removed by distillation away with the diluent.

3. The process of hydroxylating aromatic organic compounds which comprises treating the corresponding aromatic hydrocarbon in the presence of a liquid, non-aqueous, relatively inert diluent to substitute a hydrogen atom attached to the aryl ring with an inorganic acid radical that is replaceable by the hydroxyl group and then neutralizing and treating with caustic alkali to replace said acid radical with a hydroxy-group without removing the diluent and finally isolating the hydroxy compound, the diluent being selected so as to have a boiling point approximating the optimum reaction temperature.

4. The process of hydroxylating aromatic organic compounds which comprises treating the corresponding aromatic hydrocarbon in the presence of a liquid, non-aqueous, relatively inert diluent to substitute a hydrogen atom attached to the aryl ring with an inorganic acid radical that is replaceable by the hydroxyl group and then neutralizing and treating with caustic alkali to replace said acid radical with a hydroxy-group without removing the diluent and finally isolating the hydroxy compound, the diluent consisting of an aliphatic hydrocarbon.

5. The process of hydroxylating aromatic organic compounds which comprises treating the corresponding aromatic hydrocarbon in the presence of a liquid, non-aqueous, relatively inert diluent to substitute a hydrogen atom attached to the aryl ring with an inorganic acid radical that is replaceable by the hydroxyl group and then neutralizing and treating with caustic alkali to replace said acid radical with a hydroxy-group without removing the diluent and finally isolating the hydroxy compound, the first substitution and the second replacement reactions being carried out, while maintaining the diluent at about boiling temperature and with distillation of said diluent to remove the water of reaction.

6. The process of hydroxylating aromatic organic compounds which comprises treating the corresponding aromatic hydrocarbon in the presence of a liquid, non-aqueous, relatively inert diluent to substitute a hydrogen atom attached to the aryl ring with an inorganic acid radical that is replaceable by the hydroxyl group and then neutralizing and treating with caustic alkali to replace said acid radical with a hydroxy-group without removing the diluent and finally isolating the hydroxy compound, said diluent being changed in composition between the first and second steps of the reaction to increase its boiling point.

7. A process of making phenolic compounds which comprises providing the corresponding aromatic hydrocarbon compound in a saturated hydrocarbon diluent, sulphonating the hydrocarbon, then neutralizing and treating with caustic alkali, removing the diluent, and recovering the phenolic compound.

8. A process of making phenolic compounds which comprises providing the corresponding aromatic hydrocarbon compound in an inert hydrocarbon diluent, suplhonating the hydrocarbon, then neutralizing and replacing the sulpho-groups with hydroxy-groups, removing the diluent, and recovering the phenolic compound, the diluent being selected so as to have a boiling point approximating the optimum reaction temperature.

9. A process of making phenolic compounds which comprises providing the corresponding aromatic hydrocarbon compound in an inert hydrocarbon diluent, sulphonating the hydrocarbon, then neutralizing and treating with caustic alkali, removing the diluent, and recovering the phenolic compound, the water formed during each reaction being removed by distillation away with the diluent.

10. A process of making phenol which comprises preparing a reaction mixture containing gasoline and benzene, adding concentrated sulphuric acid in slight excess between equivalent proportions and 1½ times the equivalent proportions to form the mono-sulpho compound of the benzene, distilling to remove the water of the reaction, adding a high boiling kerosene fraction, adding an alkali metal carbonate to cause neutralization, then treating with a caustic alkali in slight excess of between 5 and 20% with distillation to remove the water of reaction, removing the kerosene from the sodium sulphite and sodium phenolate, and then recovering the phenol and sulphite.

11. A process of making resorcinol which comprises preparing a reaction mixture containing gasoline and benzene, adding concentrated sulphuric acid in slight excess between equivalent proportions and 1½ times the equivalent proportions to form the di-sulpho compound of the benzene, distilling to remove the water of the reaction, adding a high boiling kerosene fraction, adding an alkali metal carbonate to cause neutralization, then treating with a caustic alkali in slight excess of between 5 and 20% with distillation to remove the water of reaction, removing the kerosene from the sodium sulphite and sodium resorcinate and then recovering the resorcinol.

12. A process of making naphthol which comprises preparing a reaction mixture containing gasoline and naphthalene, adding concentrated sulphuric acid in slight excess between equivalent proportions and 1½ times the equivalent proportions to form the mono-sulpho compound of the naphthalene, distilling to remove the water of the reaction, adding a high boiling kerosene fraction, adding an alkali metal carbonate to cause neutralization, then treating with a caustic alkali in slight excess of between 5 and 20% with distillation to remove the water of reaction, removing the kerosene from the sodium sulphite and sodium naphtholate and then recovering the naphthol.

13. A process of first introducing in an aryl ring compound an inorganic acid radical that is replaceable by the hydroxyl group and then replacing said acid radical with a phenolic group without an intervening purification step which comprises providing two saturated hydrocarbon diluents boiling at the optimum temperatures for each reaction, carrying out the first reaction in the presence of the first diluent, replacing the first diluent by the other between said reactions and then carrying out the second reaction in the presence of the second diluent.

14. A process of forming phenolic compounds which comprises reacting together an aromatic hydrocarbon and sulphuric acid in the presence of gasoline with distillation to remove the water of reaction and then adding kerosene and reacting together caustic soda and the sulpho compound to form the phenolic compound with further distillation to remove the water of reaction.

15. The process of producing sodium phenolate which comprises reacting benzene and concentrated sulphuric acid in boiling gasoline and then reacting the benzene sulphonic acid with caustic soda in boiling kerosene.

16. The process of producing sodium phenolate which comprises reacting benzene and concentrated sulphuric acid in boiling gasoline and then reacting the benzene sulphonic acid with caustic soda in boiling kerosene, the boiling gasoline and kerosene being respectively distilled to remove the water produced by the reaction.

17. The process of producing sodium phenolate which comprises reacting benzene and concentrated sulphuric acid in boiling gasoline and then reacting the benzene sulphonic acid with caustic soda in boiling kerosene, the kerosene being added to the reaction mixture of gasoline and benzene sulphonic acid after the first reaction is completed.

18. The process of producing sodium phenolate which comprises reacting benzene and concentrated sulphuric acid in boiling gasoline, cooling, adding sodium carbonate to neutralize, adding kerosene and caustic soda, and then reacting the salt of benzene sulphonic acid with caustic soda in boiling kerosene.

19. The process of producing sodium phenolate which comprises reacting benzene and concentrated sulphuric acid in boiling gasoline and then reacting the benzene sulphonic acid with caustic soda in boiling kerosene at a temperature of 320 to 360° C.

VAMAN R. KOKATNUR.